United States Patent [19]

Husted

[11] 4,175,627
[45] Nov. 27, 1979

[54] PROPULSION SYSTEM FOR A SNOW GOING DEVICE

[75] Inventor: Royce H. Husted, Wheaton, Ill.

[73] Assignee: Saroy Engineering, Wheaton, Ill.

[21] Appl. No.: 892,085

[22] Filed: Mar. 31, 1978

Related U.S. Application Data

[63] Continuation-in-part of Ser. No. 790,655, Apr. 25, 1977, Pat. No. 4,095,849, which is a continuation-in-part of Ser. No. 599,003, Jul. 25, 1975, Pat. No. 4,035,035.

[51] Int. Cl.² ............................................. B62M 27/00
[52] U.S. Cl. ..................................... 180/190; 180/9.64
[58] Field of Search ................... 180/9.64, 9, 9.2 R, 180/9.5, 5 R; 280/11.13 E, 11.13 R, 11.13 A, 11.13 N; 305/35 R, 35 EB, 56

[56] References Cited

U.S. PATENT DOCUMENTS

| | | | |
|---|---|---|---|
| 2,846,017 | 8/1958 | Luchterhand | 180/5 R |
| 3,404,745 | 8/1968 | Smieja | 180/5 R |
| 3,853,192 | 12/1974 | Husted | 180/5 R |
| 3,887,023 | 6/1975 | Henning | 180/5 R |
| 4,035,035 | 7/1977 | Husted | 180/9.64 |

*Primary Examiner*—Philip Goodman
*Attorney, Agent, or Firm*—Samuel Shiber

[57] ABSTRACT

A propulsion system for a snow going device comprising a tread having a roller chain carrying cleats with a resilient snow engaging portion, and an undersurface defining a groove which slidingly contains the chain, the groove also provides a longitudinal bearing for supporting the cleats through the chain.

2 Claims, 6 Drawing Figures

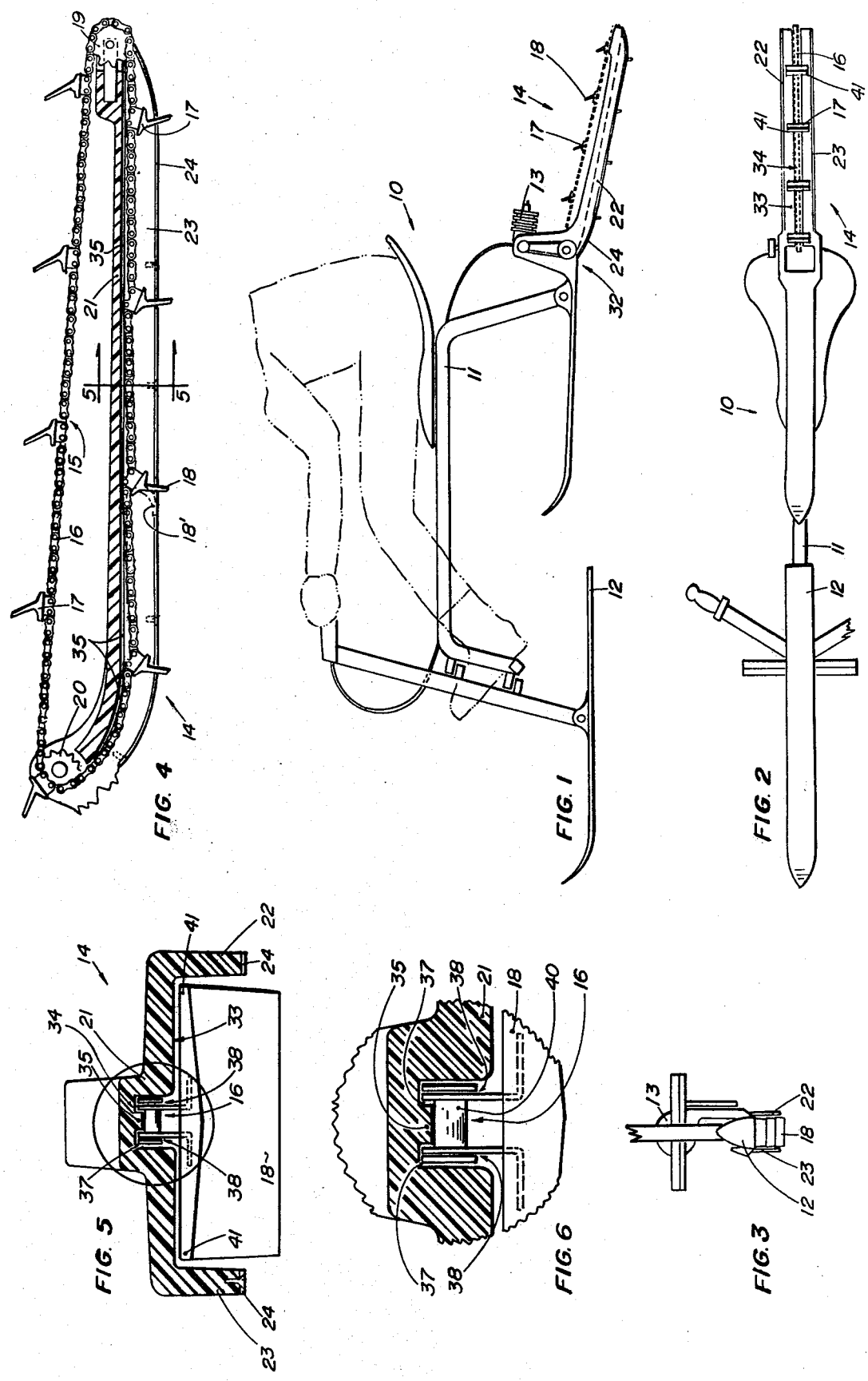

PROPULSION SYSTEM FOR A SNOW GOING DEVICE

This application is a continuation in part of my copending application Ser. No. 790,655 filed on Apr. 25, 1977, now U.S. Pat. No. 4,095,849 which is a continuation in part of my earlier application Ser. No. 599,003 filed on July 25, 1975, now U.S. Pat. No. 4,035,035.

BACKGROUND OF THE INVENTION

Throughout this application a power driven ski-bob (which will be called "Ski-bob") will be discussed with the understanding that what is said applies equally to power driven skis and other snow going vehicles, which in the claims will be referred to, commonly, as "a ski-bob type of a device".

A Ski-bob is a newcomer to the field of winter recreation. Presently there is a polarization between outdoor winter sports enthusiasts. The purists adhere to skis propelled by gravity or skier's muscles, while the modernists enjoy mounting a snowmobile which employs brute force to propel itself and its rider. Power driven ski devices (shown in my U.S. Pat. No. 3,853,192 and in the present application) bridge this gap between the purists and modernists. They do so by combining the excitement of using one's of balance to control and steer with the excitement of controlling one's propelling power, and they remove or reduce the objectionable aspects of snowmobiling. For example, the total weight of a current Ski-bob is around 30 pounds and it is propelled by a gas thrifty 3 HP engine, versus a typical snowmobile which weighs several hundred pounds and uses a gas guzzling engine ten times more powerful. Therefore, in contrast to snowmobiles, Ski-bobs have a minimal effect on the trail they pass, they do not develop large kinetic energy that may endanger their riders or others and they are not likely to get stuck in the snow, since the average rider can lift a unit in one hand. The small engine generates less acoustical energy which can be readily muffled to non-obtrusive levels.

One of the important parts of a Ski-bob is its propulsion system, and one of the propulsion system's key elements is the tread. Suitable treads are shown in the parent applications and in my copending application Ser. No. 831,163 filed on Apr. 25, 1977, which are herein incorporated by reference. As can be seen, these treads are designed to be very light, in order not to increase the weight of the Ski-bob, not to increase the power requirement and to minimize the inertial forces which are developed dynamically in the propulsion system. The snow engaging portions of the cleats are made of a resilient, usually plastic, material. The tread relies on snow for lubrication and cooling, but since the tread can run dry occasionally, for example during engine tune-up in a repair shop, etc., or almost dry as when running on icy surfaces, it is important to provide means for accommodating such situations without the tread wearing at an unacceptable rate.

Thus an important object of the present invention is to provide a means for reducing the tread's wear rate, especially when running dry.

SUMMARY OF THE INVENTION

The present invention relates to snow going devices, and particularly to an improvement in the propulsion system of a Ski-bob, which comprises: A tread having a tension carrying member (preferably a roller chain, having side plates and round cross members) carrying a plurality of cleats with a resilient snow engaging portion, and an undersurface defining a longitudinal groove which slidingly contains the chain and provides it with a longitudinal bearing which supports the chain and cleats, preferably through the cross members. The propulsion system's parts are so designed that when the cleats are not loaded (by engagement with snow) their resilient portion is spaced from the undersurface, so that when running without the benefit of snow lubrication and cooling the resilient portions of the cleats do not abrade and chafe against the undersurface. Instead, the contact between the tread and the rest of the propulsion system takes place between the longitudinal bearing and the chain. The chain is made, preferably, of hard heat treated steel and the longitudinal bearing is made, preferably, from suitable plastic, and together they form a durable and efficient bearing system. During normal operation of the propulsion system in snow, the bearing system continues to carry a substantial part of the compressive force between the tread and the undersurface, contributing to the durability and longevity of the tread.

BRIEF DESCRIPTION OF THE DRAWINGS

FIGS. 1, 2 and 3 respectively show side, bottom and partial front view of a Ski-bob incorporating the present invention.

FIG. 4 shows a sectional side view of a propulsion system,

FIG. 5 shows a sectional view of the propulsion system cut along the line 5—5, marked on FIG. 4, and FIG. 6 shows detail of the groove area encircled on FIG. 5.

DETAILED DESCRIPTION OF THE FIGS.

FIGS. 1, 2 and 3 show the general outline of a Ski-bob 10 (same numerals are used to indicate same parts throughout the FIGS.) having a frame 11 supported by a front steerable ski 12 and a power driven ski 32 having an engine 13 and a propulsion system 14. Referring now also to FIGS. 4, 5 and 6, the propulsion system comprises a tread 15 having a tension carrying member in the form of a roller chain 16 carrying a plurality of cleats 17 having snow engaging portions 18 made of a resilient material. The tread 15 is circulateably supported by idler and drive sprockets 19 and 20, respectively, around an elongated body 21. Skirt means 22 and 23 on each side and extending below the elongated body are adapted to sink in soft snow and allow the cleat 17 to fully engage the snow while preventing the snow from escaping transversely away from the cleat 17. On a hard snow, rails 24 on the bottom of the skirt means slidingly support and raise the elongated body 21 above the snow forming a space inbetween, where the snow engaging portion 18 bends smoothly without becoming overstressed, as shown in FIG. 4 in a dashed line and indicated by numeral 18'. The propulsion system has an undersurface 33 defining a longitudinal groove 34 which is adapted to slidingly contain the chain 16 and to provide a longitudinal bearing 35 for it, supporting the cleats 17 through the chain 16. As shown in FIG. 6 the longitudinal bearing 35 is straddled by two undercuts 37 running along its sides which accommodate side plates 38 of the chain, so that the longitudinal bearing 35 can contact round cross members 40 of the chain. The cross members 40 and the side plates 38 are made, preferably of hard, heat treated, steel (as in most commercial roller chains) and the longitudinal bearing 35 is made, preferably, from suitable plastic in unison with the elongated body 21 (although it can be made detachable from the elongated body to allow replacement). The hardened steel cross members 40 and the plastic longitudinal bearing 35 form together an efficient and durable bearing system which supports the cleats. The geometrical design of the groove 34 and the cleats 17 is such that the cleat's resilient portions 18 are spaced from the undersurface 33 when the cleats 17 are not loaded by engagement with snow or ice. It should be noted that the bearing system is also useful under normal operating conditions, i.e. when the propulsion system is engaged with snow, since the bearing system effectively carries a substantial portion of the compressive load which exists between the cleats 17 and the elongated body 21. As the compressive load increases the edges 41 of the resilient portion 18 start contacting the undersurface 33, and with further increase of the compressive load the contact area increases, however, at this point the propulsion system 14 is in an intimate contact with snow which provides cooling and lubrication.

Since the bearing system reduces substantially the friction and abrasion in the propulsion system 14, it also reduces the power required, i.e., it reduces the size of the engine required to propel the Ski-bob.

It should be understood that the above details have been given to illustrate the invention, but not to limit it, and that various modifications and substitutions can be made in the propulsion system without departing from the spirit of the invention or the scope of the claims.

I claim:

1. In a ski-bob type of a device, a propulsion system comprising in combination:
    a tread having a chain carrying a plurality of cleats with resilient snow engaging portions,
    an undersurface defining a longitudinal groove, said groove adapted to slidingly contain said chain and to provide a longitudinal bearing for it, supporting said cleats through said chain,
    wherein said chain is made of links having side-plates and cross-members, and wherein said longitudinal bearing slidingly and directly supports said chain through said cross members.

2. A propulsion system as in claim 1, wherein said longitudinal bearing supports said chain and said cleats so that the resilient portion of said cleats is vertically spaced from said undersurface when said cleats are not loaded.

* * * * *